(12) United States Patent
Lincoln

(10) Patent No.: US 6,779,813 B2
(45) Date of Patent: Aug. 24, 2004

(54) METHOD OF FOLDING AN AIRBAG

(75) Inventor: Paul Lincoln, Nierstein (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 94 days.

(21) Appl. No.: 10/212,807

(22) Filed: Aug. 7, 2002

(65) Prior Publication Data
US 2003/0146613 A1 Aug. 7, 2003

(30) Foreign Application Priority Data

Feb. 5, 2002 (DE) .......................................... 102 04 643

(51) Int. Cl.[7] .............................................. B60R 21/16
(52) U.S. Cl. .................................................. 280/743.1
(58) Field of Search .............................. 280/728.1, 731, 280/743.1; 53/116, 117, 427, 429; 493/243, 244, 250, 255, 374, 405, 406, 449

(56) References Cited

U.S. PATENT DOCUMENTS 6,248,052 B1    6/2001  Kleeberger et al. ......... 493/374
6,260,330 B1    7/2001  Borowski et al. ............. 53/429
6,327,838 B1   12/2001  Maul et al. .................... 53/429
6,588,179 B2 *  7/2003  Haley et al. ................... 53/429

FOREIGN PATENT DOCUMENTS

| DE | 19536625 A1 | 3/1997 | |
|---|---|---|---|
| DE | 29811042 U1 | 3/1999 | |
| EP | 0965498 | 6/1999 | |
| GB | 2342322 | 4/2000 | |
| GB | 2371025 | 7/2002 | |
| WO | WO 9822311 A1 * | 5/1998 | ........... B60R/21/20 |
| WO | WO 99/67108 | 12/1999 | |

* cited by examiner

Primary Examiner—Paul N. Dickson
Assistant Examiner—Laura B. Rosenberg
(74) Attorney, Agent, or Firm—Lonnie Drayer

(57) ABSTRACT

A method of folding an airbag of an airbag module includes the steps of: arranging the airbag and a base plate on a receiver of a folding device, with the airbag secured to the base plate, and stretching the airbag out. In order to make the device low-cost and to give a reliable procedure, a central portion of the airbag remote from the base plate is secured to a holding device of the folding device, and the airbag is stretched out by pulling the secured central portion by a movement of the holding device relative to the receiver.

4 Claims, 4 Drawing Sheets

METHOD OF FOLDING AN AIRBAG

FIELD OF THE INVENTION

The present invention relates to a method of folding an airbag of an airbag module. The invention also relates to a device for performing this method and to an airbag module having a base plate and an airbag secured to the latter.

DISCUSSION OF THE PRIOR ART

In known methods of folding an airbag of an airbag module first the airbag is secured to a base plate, from which it is then stretched out on a folding device into at least one outer tube. The stretched-out airbag located in the outer tube is then folded by a die or piston of the folding device moving into the outer tube. During folding, the airbag is thus laid in a chaotic folding arrangement.

It is known from DE 298 11 042 U1 to displace a die through the base plate into the airbag in order to stretch out the airbag. Introducing a die in this way is only possible with base plates of airbag modules which are not substantially closed in the direction of stretching out the airbag, however.

It is known from U.S. Pat. No. 6,260,330 to stretch out an airbag of an airbag module before it is folded by inflating it in an outer tube. The method step of inflation results in a relatively long cycle time, however, and is moreover only possible if no inflator is pre-mounted on the base plate.

According to the present invention, before the airbag is folded inside an outer tube, a central portion of the airbag remote from the base plate is to be arranged or mounted or secured on or to a holding device of the folding device, and the airbag is subsequently to be stretched out by pulling this secured central portion. The pulling is performed by a movement of the holding device relative to the receiver. During this movement, alternatively, the holding device or the receiver may be moved individually or in combination relative to one another. In contrast to known methods, according to the invention the airbag is not pushed from the inside outwards in the direction of stretching out, but rather it is pulled on its outside with the aid of a holding device. This pulling may be performed in a manner giving a reliable procedure, using a device that can be produced at low cost.

DETAILED DESCRIPTION OF THE INVENTION

Figure 1:
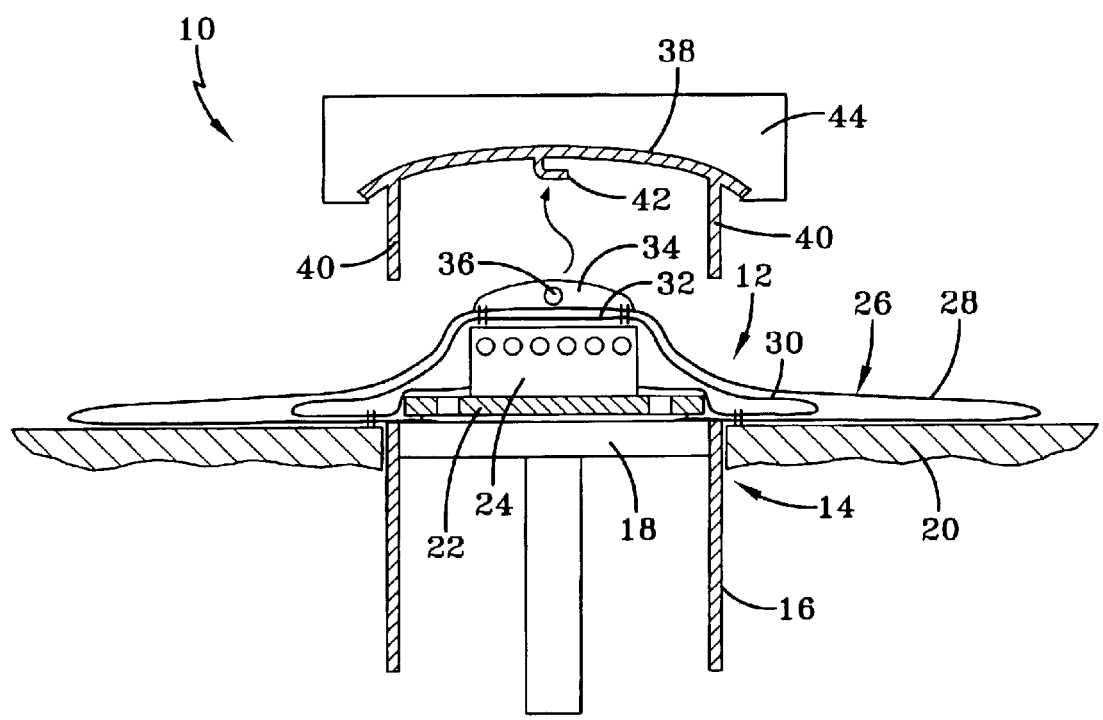
FIG. 1 shows a first embodiment of a device according to the invention for folding an airbag of an airbag module, in a side view in partial section.

FIG. 1 illustrates a device 10 for folding an airbag of an airbag module 12, in particular a driver's side airbag module. The device 10 has a receiver 14 with a substantially vertically arranged cylinder or tube 16 and a piston or die 18 arranged displaceably therein. Constructed around the upper edge, as seen in FIG. 1, of the tube 16 is a support 20.

The airbag module 12 is arranged on the receiver 14. A base plate 22 lies on the piston 18, and in the center of the base plate 22, remote from the piston 18, there is constructed a structure 24 for arranging or inserting an inflator (not illustrated). Advantageously, instead of the structure 24, the inflator itself may be used with a base plate arranged thereon. An airbag 26 is secured to the base plate 22 and includes an outer sheath 28 and restraining tethers 30 arranged therein. The airbag 26 is laid out with its outer sheath 28 over the base plate 22 and is spread out over the support 20. In an advantageous further development of the method according to the invention, before the step of stretching out the airbag, an inflator is connected to the base plate already is or has been arranged on the receiver of the device.

Alternatively, or in addition, an airbag cover 38 may be provided on the airbag 12 module on the holding device, and this airbag cover remains on the airbag 26 after the latter has been stretched out and folded. It is then possible to secure the central portion 24 of the airbag directly to the airbag cover of the airbag module and in some cases to construct this connection such that it is only released when the airbag mounted in a vehicle is activated. By releasing the connection, the deployed airbag can unfold freely, and protect a vehicle occupant.

It is advantageous if the central portion 24 of the airbag 26 is secured to the holding device 44 by a releasable connection, in particular by bringing the central portion of the airbag into engagement or hooked arrangement with the holding device. Suitable releasable connections are in principle hook-and-eye connections. Advantageously, it is also possible to attach or stitch a connection face of a hook-and-burr closure to the central portion of the airbag to be secured, and for a second connection face of the hook-and-burr closure, permanently attached to the holding device, to be merely pressed against this for the purpose of connection, in order to make the releasable connection. In order to release the hook-and-burr closure, an opening may be made on the holding device that may fix the central portion of the airbag in position, while the holding device is removed when the hook-and-burr closure is opened. Alternatively, the hook-and-burr closure may be used in combination with a cover of the airbag module, only being released when the airbag is activated. Alternatively, it is also possible for a type of gripper device, for example a tong-shaped gripper device, to be provided so that the airbag only needs to have a tab where it is gripped, without the tab 34 having to have holes 36 or the like, however. It is also possible to provide a type of suction device, so that the tab can be dispensed with altogether and the suction device consequently takes hold of a central portion of the airbag.

A central portion 32 of the outer sheath 28 of the airbag 26 remote from the base plate 22 is provided with a tab 34 which projects upwards, as seen in FIG. 1, from the outer sheath 28. The tab 34 has a through opening 36 therein, located approximately in the center of the tab.

Above the tab 34, as seen in FIG. 1, an airbag cover 38 in the form of a cover of the airbag module 12 is arranged on the device 10. The airbag cover 38 has downwardly projecting webs 40 and, in the center of its underside, a hook 42 which projects downwards, as seen in FIG. 1. The airbag cover 38 is supported by a holding device 44 that is movable substantially vertically relative to the receiver 14 of the device 10.

With the aid of the device 10, the airbag 26 of the airbag module 12 can first be stretched out and then folded. In order to be able to perform these operations, first the tab 34 is hooked onto the hook 42 of the airbag cover 38, manually or automatically, at the through opening 36. Then, the piston 18 moves in the tube 16, as a result of which the base plate 22 moves downwards, as seen in FIG. 1. During this relative movement between the receiver 14 and the holding device 44, the central portion 32 of the airbag 26 is pulled away from the base plate 22, and the outer sheath 28 of the airbag 26 is at the same time stretched out until the restraining tethers 30 are substantially fully taut.

At the same time, the tube 16 may be moved upwards and/or the airbag cover 38 with the holding device 44 may be moved downwards until the webs 40 of the airbag cover 38 are set on the upper rim of the tube 16. Then, the piston 18 is moved upwards, as seen in FIG. 1, inside the tube 16. During this movement, the airbag 26 is laid in chaotically arranged folds inside the tube 16 and at the same time pushed into the airbag cover 38 from below.

The through opening 36 in the tab 34 is constructed such that when the airbag module 12 having the airbag 26 is installed in a vehicle and is deployed, the connection between the tab 34 and the hook 42 is released automatically. Once the connection has been automatically released, the airbag 26 can unfold freely, independently of the airbag cover 38.

Figure 2:
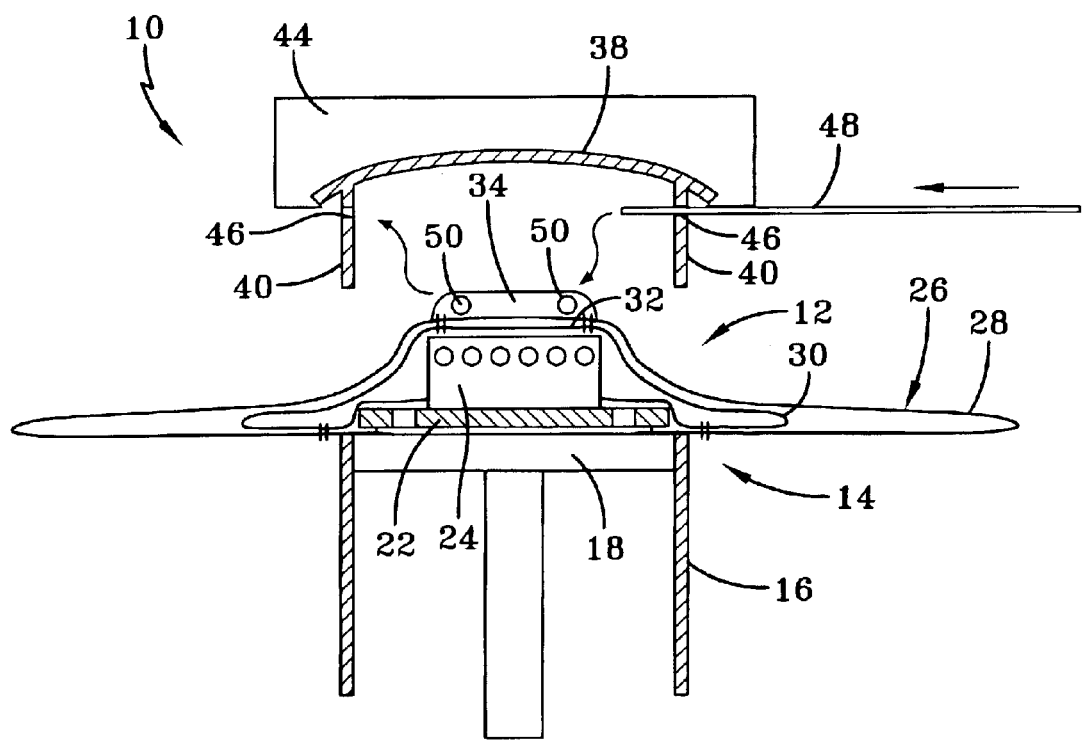
FIG. 2 shows a second embodiment of a device according to the invention for folding an airbag of an airbag module, in a view according to FIG. 1, during a first method step.
Figure 3:
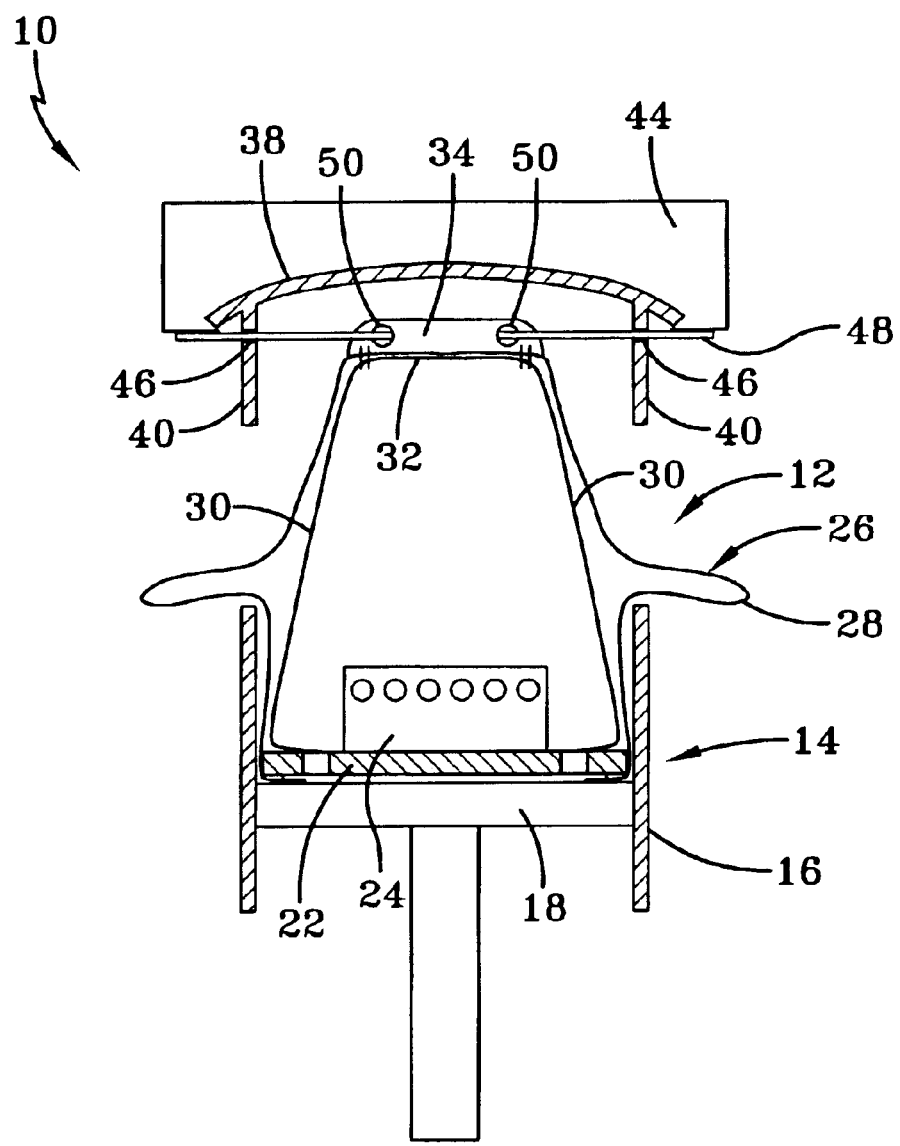
FIG. 3 shows the view according to FIG. 2, in a second method step.

FIGS. 2 and 3 illustrate a second embodiment of the device 10, which is shaped in a manner corresponding to the device 10 illustrated in FIG. 1 as regards the receiver 14.

For the device 10 according to FIGS. 2 and 3, the associated airbag module 12 on the airbag cover 38 and the airbag 26 is, however, slightly modified. The airbag cover 38 is provided on each of its webs 40 with a substantially horizontally extending hole 46. The two holes 46 lie opposite one another, so that a rod 48 may be pushed through the two holes manually or automatically. Two through openings 50 are located in the tab 34 of the airbag 26, by which the tab 34 may be threaded onto the rod 48. The rod forms a first connection element that cooperates with the through holes in the tab on the airbag, as second connection elements. By withdrawing the rod from the through holes in the tab on the airbag at the end of the folding procedure, the connection between the airbag and the airbag cover may be released, so that when the airbag is activated it may unfold independently of the airbag cover. At the same time, the airbag cover is already pre-mounted on the folded airbag for further assembly of the airbag module.

The connection, made by the rod 48 and the through openings 50 in the tab 34, between the airbag cover 38 and the central portion 32 of the airbag 26 creates a releasable connection by which the central portion 32 of the airbag in the device 10 can first be pulled away from the base plate 22, while it still remains possible for the central portion 32 of the airbag to be released from the airbag cover 38 again once the airbag 26 has been folded. For the purpose of release, all that is necessary is for the rod 48 to be withdrawn from the two holes 46 in the webs 40 and from the two through openings 50 in the tab 34. The connection between the airbag cover 38 and the airbag 26 is hence released again, and the airbag 26 can later be unfolded in a safety-critical situation, independently of the airbag cover 38.

FIG. 3 illustrates how the tab 34 of the airbag 26 is secured to the airbag cover 38 with the aid of the rod 48 and hence to the holding device 44 while the airbag is being stretched out. FIG. 3 shows the step during which the restraining tethers 30 are fully taut. During this step, the outer sheath 28 of the airbag 26 still forms a peripheral folded layer. This folded layer is moved upwards, as seen in FIG. 3, into the interior of the tube 16 by a subsequent displacement of the tube 16. At the same time, the upper rim of the tube 16 is guided towards the webs 40 of the airbag cover 38. As a result of a subsequent upward movement of the piston 18, the airbag 26 is laid in folds and compressed in the interior of the tube 16 and below the airbag cover 38. At the end of the upward movement of the piston 18, the rod 48 is withdrawn from the holes 46, and finally the folded airbag 26 is pushed into the underside of the airbag cover 38 by the piston 18. The airbag module 12 is pre-mounted with its folded airbag 26 and the airbag cover 38.

Figure 4:
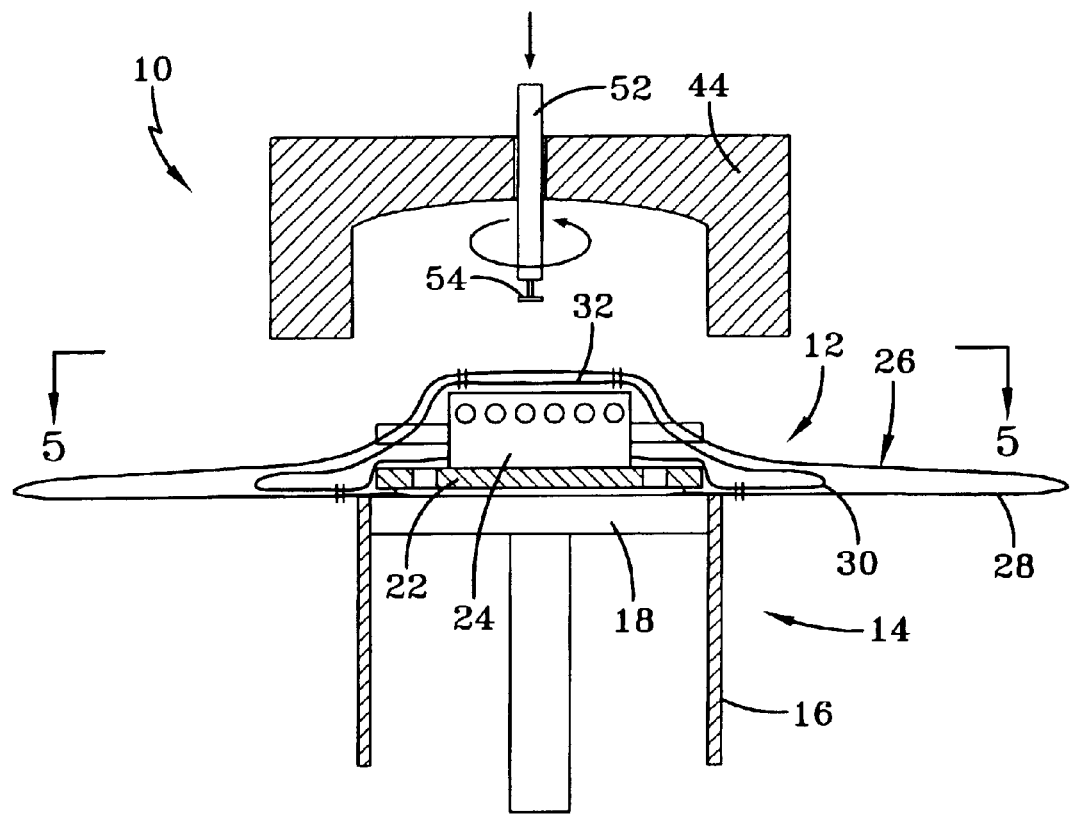
FIG. 4 shows a third embodiment of a device according to the invention for folding an airbag of an airbag module, in the view according to FIG. 1.

FIG. 4 illustrates a third embodiment of a device 10 according to the invention. The device is shaped in a manner corresponding to the devices 10 illustrated in FIGS. 1 to 3 as regards the receiver 14. As regards the holding device 44, however, no airbag cover 38 is provided in the case of the device 10 according to FIG. 4. Instead, the holding device 44 is constructed in a shape that corresponds to the underside of an airbag cover 38 of an airbag module 12.

A substantially vertically arranged pin 52 passes through the center of the holding device 44, and a hook element 54 is constructed on the underside thereof. The hook element 54 has two hook wings 56 which are opposite one another and extend substantially horizontally. An elongate opening 58, below which a fabric layer of the restraining tethers 30 is also located, is constructed in the outer sheath 28 of the airbag 26 of an associated airbag module 12.

Figure 5:
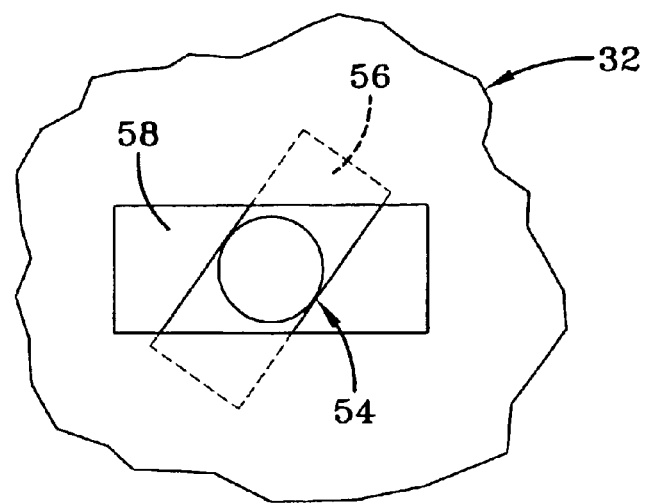
FIG. 5 shows a plan view according to FIG. 4, on a larger scale.

In the device 10 illustrated in FIGS. 4 and 5 for folding the airbag 26, a releasable connection is made between the holding device 44 and the central portion 32 of the airbag 26 in that the pin 52, by its hook wings 56 on the hook element 54, is first pushed through the opening 58 in the outer sheath 28 and then turned through an angle of approximately 90°. During this turning movement, the hook wings 56 are pushed underneath the outer sheath 28 in the central portion 32. When the receiver 14 is subsequently moved relative to the holding device 44, the central portion 32 is secured to the holding device 44 with the aid of the hook element 54 and is hence pulled away from the base plate 22 in order to stretch out the airbag 26.

Then, the procedure of folding the airbag 26 is performed, as illustrated in particular in FIG. 3. At the end of the folding procedure, the pin 52 is again turned through an angle of approximately 90°, as a result of which the hook wings 56 of the hook element 54 are brought into congruence with the elongate opening 58 in the outer sheath 28. The airbag module 12, together with its folded airbag 26, can now be moved out of the holding device 44 because the connection between the hook element 54 and the central portion 32 of the airbag 26 is then undone again. The airbag module 12, together with its folded airbag 26, can be further installed.

In an exemplary embodiment of a device for folding an airbag of an airbag module which is not illustrated, an airbag cover is provided through which a pin 52 illustrated in FIGS. 4 and 5 can be introduced. With the aid of hook wings 56 on the pin 52, the airbag can then be stretched out underneath the airbag cover. Then the pin 52 is released from the airbag again and withdrawn from the airbag cover. The opening required in the airbag cover is closed for example using an emblem of a vehicle manufacturer. Alternatively or in addition to a rotary pin 52, a rotary and/or pivotal hook may also be provided.

The method according to the invention, the associated device and the correspondingly shaped airbag module are particularly useful if the base plate 22 of the airbag module is substantially closed in the direction of stretching out the airbag. According to the invention, with an airbag module of this kind the airbag can be stretched out although no die or piston can be pushed in through the substantially closed base plate for the purpose of stretching out the airbag.

The method according to the invention can also be used with airbag modules in which an inflator is already pre-mounted on the base plate before the method steps of stretching out and folding. The pre-mounted inflator makes it impossible for a die or piston still to be pushed in through the base plate. Furthermore, as a result of the already pre-mounted inflator, the airbag of the airbag module cannot be inflated in order to stretch out the airbag in the interior by increasing the pressure.

In order to be able to push the folded airbag, once it has been folded, into a housing of the airbag module or cover, it is advantageous if the said connection is released at the end of the step or after the step of stretching out the airbag. Release can be performed particularly simply by withdrawing a first connection element between the airbag and the holding device. The folded airbag can then be installed independently of the holding device.

It is to be understood that the present invention is not limited to the details of any one embodiment in any one figure, but are defined by the appended claims. The scope of the appended claims should be interpreted to encompass all such modifications, similar arrangements and procedures.

I claim:

1. A method of arranging an airbag on a folding apparatus prior to folding the airbag comprising the steps of:

(a) arranging the airbag and a base plate on a receiver of a folding device, with the airbag secured to the base plate;

(b) stretching the airbag out;

(c) arranging or securing a central portion of the airbag remote from the base plate on or to a holding device of the folding device, the central portion of the airbag is secured to the holding device by a releasable connection by bringing the central portion of the airbag into engagement or hooked arrangement with the holding device;

(d) stretching out the airbag by pulling the secured central portion by a movement of the holding device relative to the receiver; and (e) releasing the connection by withdrawing a first connection element between the airbag and the holding device.

2. The method according to claim 1, further comprising the step of arranging an inflator connected to the base plate on the receiver before step (b).

3. The method according to claim 2, further comprising the steps of arranging an airbag cover of an airbag module on the holding device, and securing the central portion of the airbag to the airbag cover of the airbag module.

4. The method according to claim 1, further comprising the steps of arranging an airbag cover of an airbag module on the holding device, and securing the central portion of the airbag to the airbag cover of the airbag module.

* * * * *